Nov. 24, 1925.
L. A. BUNDS
1,562,821
METHOD FOR COATING PARTICLES WITH INERT POWDER
Filed April 14, 1925
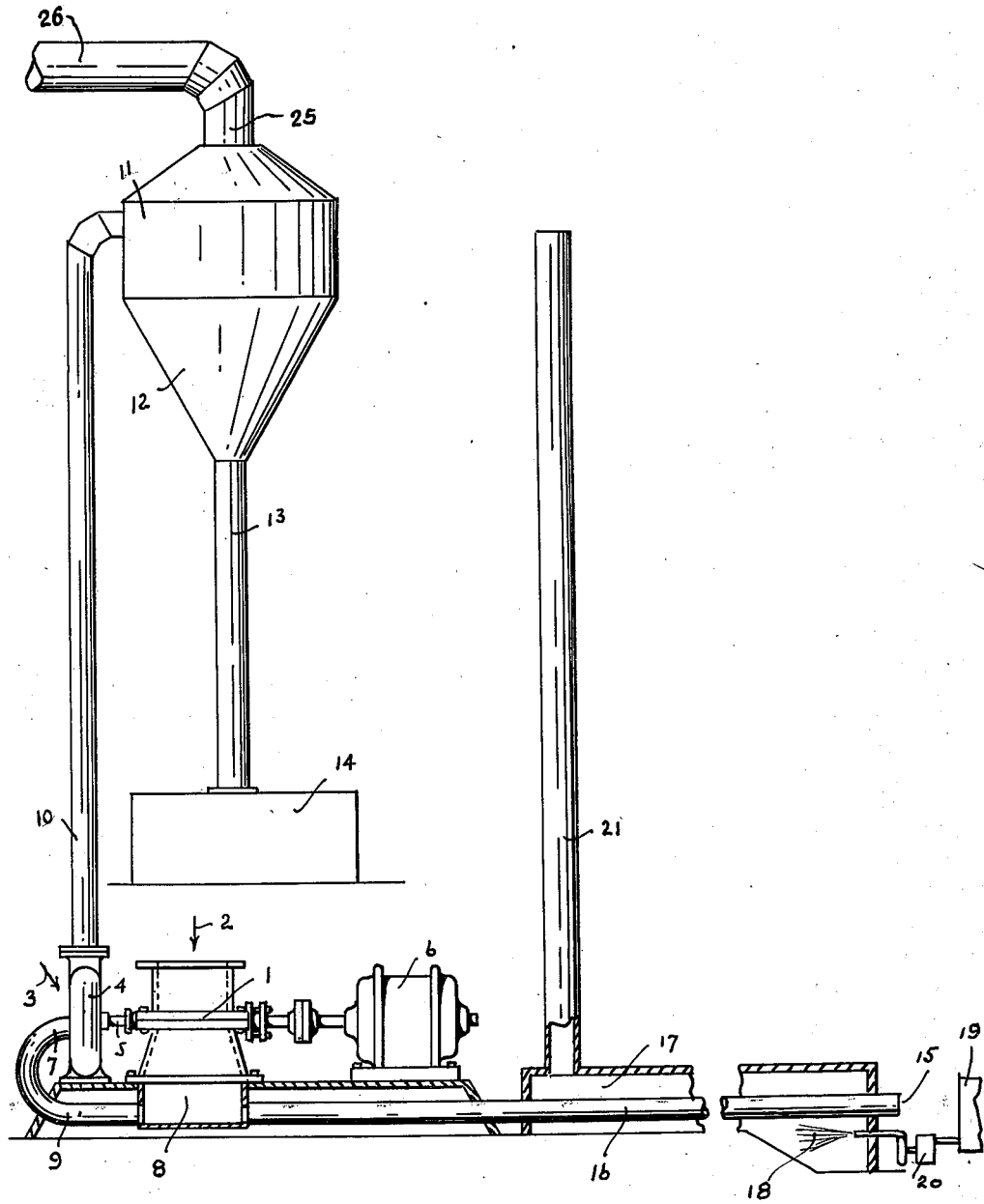
INVENTOR.
Lester A. Bunds.
BY Miller Henry & Boykon
ATTORNEYS Patented Nov. 24, 1925.

1,562,821

UNITED STATES PATENT OFFICE.

LESTER A. BUNDS, OF SANTA CLARA, CALIFORNIA, ASSIGNOR TO SAN JOSE SPRAY MFG. CO., OF SAN JOSE, CALIFORNIA, A CORPORATION OF CALIFORNIA.

METHOD FOR COATING PARTICLES WITH INERT POWDER.

Application filed April 14, 1925. Serial No. 23,026.

*To all whom it may concern:*

Be it known that I, LESTER A. BUNDS, a citizen of the United States, residing at Santa Clara, county of Santa Clara, State of California, have invented new and useful Improvements in Methods for Coating Particles with Inert Powder, of which the following is a specification.

My invention is particularly adapted to the production of a readily soluble copper sulphate and is a further improvement on the process set forth in my co-pending application Serial No. 681,086, filed December 17, 1922, to which reference is here made.

Copper sulphate is extensively used in the arts and in the preparation of insecticides, sprays, and the like and unless especially prepared, is extremely difficult to dissolve. The blue stone or copper sulphate of commerce is a crystalline product and the crystals because of water of crystallization or deliquescence adhere together and agglomerate into a solid mass which must dissolve from the outside in, which is an extremely slow procedure even with constant stirring.

I have found that by grinding copper sulphate and coating the particles thereof with a more finely ground inert powder, the particles of copper sulphate are held apart and agglomeration is prevented, and in such condition the prepared copper sulphate readily dissolves in water. I have found talc to be very effective as such an inert powder.

It is the object of my present invention, as herein set forth to prepare and coat the copper sulphate particles while they are in a dried condition by the employment of suitable process steps and apparatus and the employment of heat.

These objects I attain by grinding the copper sulphate, preferably in the presence of a more finely ground inert powder and then separating and intermixing the copper sulphate particles and the inert powder particles in a current of heated air, whereby the copper sulphate is dried and brought into intimate contact with the finer inert particles so that each unit particle of copper sulphate is covered by the inert particles which adhere thereto during the drying step.

After the mass in finely divided condition has passed, with the current of hot air, through suitable conveying means it is preferably delivered into a separator wherein the current of air carrying the particles is whirled about, during which the centrifugal force separates the copper sulphate coated particles in the outer portions of the separator and any superfluous inert powder is drawn off through a central opening in the separator.

By referring to the accompanying drawing my invention will be made clear wherein is shown partly in section and partly in elevation a side view of the apparatus adapted to employ my invention.

Referring to the drawing:

The numeral 1 indicates a conventional grinding apparatus into which the copper sulphate to be ground is introduced as indicated by the arrow 2.

While I prefer to introduce the inert powder together with the copper sulphate, this is not essential and it may be introduced after the copper sulphate is ground as through any suitable inlet for example, in the direction of the arrow 3 into the fan 4.

The fan is driven from the shaft 5 and operated from the motor 6 which preferably also actuates the grinder 1.

The inlet of the fan is shown at 7 and a sump or discharge box 8 located under the grinder and receiving the ground copper sulphate delivers the material from the box 8 through the pipe 9 to the suction side of the fan 4.

The current of air established by the fan picks up the ground particles and with the more finely ground inert powder either introduced at 2 or through the suitable opening on the suction side of the pump as indicated by the arrow 3, and conveys the same through the pipe 10.

During the travel of the particles through the pipe 10 the finer ground particles of inert matter adhere all over the surfaces of the copper sulphate particles, so that when the mixture is delivered into the centrifugal separator 11 the coated particles are whirled to the outside by centrifugal force and follow through the funnel 12, delivery pipe 13, and into the collecting hopper 14 as a finished product.

Any superfluous inert powder which does not adhere to the copper sulphate particles is drawn off through center connection 25 as by any conventional suction means acting through the pipe 26.

I have found that the application of heat to the ground copper sulphate is advantageous in removing any superfluous moisture and a portion of the water of crystallization and this drying I accomplish by providing an air inlet at 15 in a connecting pipe 16 which passes into the fan connection 7 either through the box 8 or separately therefrom.

The pipe 16 is heated in the compartment 17 as by the oil flame 18 supplied from the tank 19 and injector apparatus 20, the product of combustion passing up through the chimney 21.

In practice the pipe 16 is maintained at a red hot or high temperature and thus the air passing in at 15 is highly heated when it comes in contact with the ground copper sulphate particles and abstracts the requisite superfluous moisture therefrom and during the travel from the sump 8 into the separator 11.

During this drying step the inert particles are seized and held on the copper sulphate particles as a tenacious surface coating thus holding every copper sulphate particle separated from its neighbors in the resulting mass that falls in the hopper 14 suitable for packing transportation and indefinite handling.

I claim:

1. The method of preparing a readily soluble copper sulphate which consists of grinding the copper sulphate with a more finely ground inert substance and then conveying the mixture in a current of hot air whereby a portion of the contained moisture is dried from the copper sulphate with the inert particles adhering to the copper sulphate particles.

2. The method set forth in claim 1 and wherein the mixture is thereafter passed into a centrifugal separator whereby any superfluous inert particles are removed.

3. The method of preparing a crystalline salt which consists of conveying the ground salt in a current of hot air while intermixed with an inert and more finely ground powder, whereby the evaporation from the salt particles leaves a salt residue on the particles in which the inert particles are held.

LESTER A. BUNDS.